United States Patent [19]
Jackman

[11] 3,910,775
[45] Oct. 7, 1975

[54] METHOD AND APPARATUS FOR PROCESSING REFUSE, SEWAGE AND/OR WASTE MATERIAL INTO A SOURCE OF ENERGY

[75] Inventor: Victor Jackman, North Huntingdon, Pa.

[73] Assignees: John M. Fox; John V. McKeever; Harry F. Ferguson; John B. Sotak, all of North Huntingdon, Pa. ; part interest to each

[22] Filed: Feb. 22, 1974

[21] Appl. No.: 444,787

[52] U.S. Cl. ............................ 44/13; 44/1 D; 44/12; 110/8 R; 210/500
[51] Int. Cl.² ... B30B 11/00; C10L 5/22; F23G 5/00
[58] Field of Search...... 44/1 D, 1 R, 10 R, 2, 10 A, 44/11-13; 110/8 R; 210/500

[56] References Cited
UNITED STATES PATENTS

| | | | |
|---|---|---|---|
| 3,506,414 | 4/1970 | Skendrovic | 44/1 R |
| 3,759,196 | 9/1973 | Spaite | 110/8 R |
| 3,790,091 | 2/1974 | Law et al. | 44/10 R |
| 3,830,636 | 8/1974 | Marsh | 44/1 D |

*Primary Examiner*—Carl F. Dees
*Attorney, Agent, or Firm*—John B. Sotak

[57] ABSTRACT

This disclosure relates to a method and apparatus for handling refuse, using waste and treating raw sewage. The collected refuse is delivered to a receiving bin having an electrical vibrator and a power operated discharge door. The ferromagnetic articles are removed from the collected refuse by a magnetic separator. A shredder homogenizes the separated refuse, and acidic waste from a dispensing hopper is controllably mixed with the shredded refuse. The mixture of refuse and acidic waste is fed into a vertical rolling mill which dewaters and forms the refuse and waste mixture into briquettes. The briquettes from the rolling mill are dropped into a storage area which functions as a supply source from which briquettes are conveyed to a feeding trough. The briquettes of waste and refuse are controllably fed by the trough into a filtration tank to form a filtering bed. A supply conduit controllably delivers raw sewage effluence into the filtration tank so that the solids, matter in suspension and precipitates are entrapped by the filter bed medium. A level sensing device senses the amount of liquid in the tank, and a filter medium detector senses the depth of the filter bed so that expended filtering material is withdrawn from the tank by a power operated transport auger. The transport auger feeds an extruding mechanism which pelletizes the withdrawn expended filtering material. The pellets are conveyed to either a dispensing hopper or a pellet storage bin. The pellets are released from the pellet processing dispensing hopper and waste is also selectively and controllably released from the waste dispensing hopper. The mixture of pellets and waste is conveyed to the rolling mill for dewatering and for forming briquettes. The briquettes are fed to a storage area for subsequent use as a useable fuel.

32 Claims, 3 Drawing Figures

METHOD AND APPARATUS FOR PROCESSING REFUSE, SEWAGE AND/OR WASTE MATERIAL INTO A SOURCE OF ENERGY

FIELD OF THE INVENTION

This invention relates to an improved method and apparatus for processing refuse, such as garbage, rubbish trash, and other debris along with raw sewage and/or waste material into a source of energy and, more particularly, to a unique system including means for homogenizing heterogeneous refuse, means for adding acidic waste to the homogenized refuse, means for mechanically dewatering and forming the homogenized refuse and waste into a filtering medium, means for passing raw sewage through the waste-refuse filtering medium and filtering the solids, matter in suspension and precipitates from the sewage, means for expelling moisture from the expended waste-refuse filtering medium, means for subsequently adding combustible waste for increasing the B.T.U. value, and means for mechanically dewatering and for forming the waste-refuse filtering medium into a nonpolluting type of fuel.

BACKGROUND OF THE INVENTION

At the present time the word "ECOLOGY" is a household term. The ever increasing pollution of our three natural assets, namely, water, air and land, has led ecologists and other interested individuals and groups and also our political leaders as well as the general public to demand relief from the ensuing ecological problem. The federal, state and local governmental agencies and authorities have enacted stringent anti-pollution laws and ordinances in an attempt to restrict all-out pollution by our industrial oriented society.

Some state and local ordinances and Federal Clean Air Act of 1970 limit the amount of smoke, sulphur dioxide, carbon, fly ash, unburnt hydrocarbons, and other pollutants which are permitted to be emitted into the atmosphere from coal burning power and generating plants, steam boilers, refuse incinerators, steel making furnaces, and the like. Accordingly, it has been necessary for these facilities to utilize costly low-sulphur content coal, to employ prohibitively expensive ancillary dust and particle collecting apparatus in their operations or to convert their facility to another type of fuel utilization installation. It will be appreciated that low-sulphur coal is not always readily available in sufficient quantities to meet all of the existing demands, and at the present time there is no economical and feasible method for converting high-sulphur coal into an acceptable low-sulphur fuel. Thus, it would be highly advantageous to the coal user and consumer to have available low cost high grade substitute fuel which would meet or surpass the clean air quality standards set out in the various anti-pollution laws.

There are also enacted laws on the books in the form of the federal water pollution control act and other clean waterway statutes which purportedly protect our waterways, such as, streams, creeks, rivers, dams, and lakes, against careless or wanton polluting by industrial, commercial and municipal facilities. Each of the facilities results in the pollution causing the killing of aquatic animals and making the milieu uninviting to man. One of these sources is mine spillage which repeatedly runs into our waterways. It has been found that high concentration of said pollution occurs during periods of spring thawing and during rainy periods when the on-rushing surface water readily combines with and picks up the sulphuric acid from coal washing ponds and strip mine workings and eventually finds its way into the streams and creeks and, in turn, flows into the rivers, lakes and dams. Another origin of water pollution resides in the numerous municipal and commercial sanitary facilities or processing plants which handle the sewage treatment for the various towns, boroughs, cities and other communities. In recent years, domestic commercial and industrial sewage effluent has been found to contain excessive amounts of phosphates and other soluble mineral salts which result in high alkalinity. The discharge of the hig alkaline liquid into the waterways causes the rapid growth of algae and vegetation which clog and block the free flow of water and remove vitally needed oxygen from the water that is required for sustaining fish and other aquatic wildlife. In some shallow water areas, the outgrowth of phosphate nurtured vegetation and algae has resulted in dramatic change to the point where dismal swamp lands and boggy areas are formed. In addition to alkaline water pollution, the sewage plants are susceptible to more serious polluting problems when overflowing storm and other surface water enter the sanitary sewer system during periods of severe rain storms and during sudden spring thawing. In numerous cases many sewage treatment plants are incapable of handling this excessive amount of rain storm and melted snow water as well as coping with sewage effluent particularly during peak hours, and these vast amounts of raw sewage are required to be directly dumped into the waterways. This causes not only an ecological problem but also a health hazard.

An additional type of pollution occurs on land rather than in the air or water. One of our major pollution problems in the Mid-Atlantic region of the country involves coal washings or fines which presently have little, if any, commercial value. After the usable coal is processed, the remanents or washings are generally abandoned on site or are dumped in some isolated area, normally without regard to subsequent ecological consequences. Thus, unsightly devastation of barren rocks and coal washings or coal fines spew the surface of the land and when contacted by water normally form pools or ponds of noxious and acidic solutions which are harmful to plants as well as animals.

Another form of surface pollution is the depositing of garbage, trash, debris, rubbish, and the like onto land fills and dumps. More likely, the dumped refuse contains various contagious and harmful bacteris which may be spread by rodents and insects that find haven therein. At the present time in megalopolises and smaller metropolitan areas, the availability of landfills is becoming virtually nonexistent, and therefore the daily generated refuse must be collected and transported at a substantial cost to distant dumping grounds or out to the open sea. It will be appreciated that every attempt to return the environment to its natural anti-polluted condition must include a satisfactory solution of disposing of the daily generated rubbish and refuse without the use of incinerators or the dumping of this refuse material onto landfills and into the ocean. Such practices must be discontinued in order to mitigate the polluting of the land, water, and air.

Further, the operation of sewage treatment plants must be dramatically improved in order to prevent further contamination of our waterways. For example, it is necessary to devise a more effective method of handling sewage effluence during above normal peak processing periods when overflowing and uncontrollable water accidentally enters the sewage system. In addition, it is required under the recently enacted "Occupational Safety Hazard Act of 1972" (OSHA) for all employers to provide safe working conditions for their employees. Presently, the employer of privately owned or municipally controlled sewage treatment plants is in violation of the Act by necessitating workers to physically handle and dispose of the raw sewage or the remanent sludge which is infested with pathogenic bacteria. In order to comply with OSHA's safety requirements it is of utmost importance for the sewage authorities to minimize the exposure to which sanitary employees are required to come in physical contact with the sewage during processing and treatment.

Further in view of the recent energy crisis and fuel shortage there is growing need to develop substitute fuels and to uncover new sources of energy in order to meet the demands of our present day consumption. Presently, the fuel shortage has even prompted our government to lift the clean air ban by allowing and encouraging consumers to revert to burning high-sulphur containing coal and oil which once again are permitted to pollute our environment. Thus, it is of paramount importance to all of us to attempt to maintain the milieu free from all unnecessary contaminants which will result in the pollution in the land, water and air by more efficiently utilizing our natural resources as well as by more effectively employing refuse, sewage and waste to provide a source of energy.

OBJECTS OF THE INVENTION

Accordingly, it is an object of this invention to provide a new and improved system for converting refuse, raw sewage and/or waste material into a useable fuel.

A further object of this invention is to provide novel apparatus for processing garbage, raw sewage and/or waste material into a source of energy.

Another object of this invention is to provide a unique and ingenious facility for utilizing processed garbage for removing sludge from raw sewage by a filtration method.

Yet another object of this invention is to provide a source of anti-polluting type of solid-fuel energy by combining processed refuse with sewage sludge and remanent waste by homogenization, filtration and compression.

Yet a further object of this invention is to provide an improved source of useable fuel by homogenizing heterogenous refuse and forming it into a filtering medium and for filtering solids and matter in suspension from raw sewage and thereafter dewatering the expended filtering medium.

Still another object of this invention is to provide new and unique apparatus for processing garbage, raw sewage and waste material into substitute fuel by homogenizing, briquetting, filtering, pelletizing.

Still a further object of this invention is to provide a system for processing refuse and water into a filtering medium and for treating raw sewage by passing the raw sewage through the filtering medium thereby removing solids and matter in suspension from the raw sewage and thereafter mechanically compressing the expended filtered medium to remove excess moisture and forming the medium into useable fuel.

Yet another object of this invention is a method of processing garbage, raw sewage and waste by homogenizing, compressing, filtering and dewatering to render the garbage, sewage and waste remanents into a consumable source of fuel.

Yet a further object of this invention relates to a process of converting garbage, sewage and waste into a useable fuel by separating certain noncombustible matter from the garbage, by homogenizing the separated garbage, by adding waste to the homogenized garbage, by compressing and forming the combined garbage waste into a stable dewatered material, by passing sewage through the dewatered material to filter out solids, sludge and precipitates therefrom, by increasing the B.T.U. value of the material by combining combustible waste with the material and by compressing excess moisture from the combined material and forming it into briquettes.

An additional object of the invention is to provide a method of handling refuse, sewage and waste by reducing the size of collected refuse, by mixing waste to the reduced refuse, by compressing excess moisture from the reduced refuse and waste and by forming it into a filtering medium, by passing raw sewage through the waste and filtering medium for removing matter from the raw sewage, by dewatering and by forming the filtered matter, combustible waste and filtering medium into a dry fuel.

Yet an additional object of this invention is to provide a processing garbage, sewage and waste material, by separating metallic objects from the garbage and by shredding the garbage, by dewatering and forming the combined waste ans shredded garbage into a filtering substance, by passing sewage through the filtering substance for removing sludge from the sewage, and by compressing the sludge and filtering substance into useable and storable fuel.

Still an additional object of this invention is to provide a method of processing garbage by shredding the garbage in small pieces, by separating metallic objects from the garbage, by mixing a select amount of waste to the garbage, by compressing excess water from the waste and garbage and by forming the waste and garbage into a dry medium, by passing raw sewage through the dry medium for filtering solids, sludge and matter in suspension from the sewage, and by dewatering the garbage, waste and sewage material into a stable unseable fuel medium.

In addition it is an object of this invention to provide a new and improved apparatus for processing refuse, waste and raw sewage into useable fuel which is efficient in operation, reliable in service and durable in use.

SUMMARY OF THE INVENTION

In accordance with the present invention one of the disclosed embodiments includes apparatus for processing collected garbage or refuse, raw sewage and combustible waste into a source of useable fuel. The collected garbage or refuse is dumped into a receiving hopper or bin from trucks of the sanitation collection authority or contracted company. The common everyday collected garbage or refuse is heterogenous in nature in that it includes various materials, such as, paper, plastic, leather, rubber, textiles, leaves, branches, wood, grass and plant clippings, food waste, glass, ceramic, stone, masonary, metals, dirt, and other extraneous matter. The heterogeneous refuse or garbage is shaken out of the receiving bin onto a moving magnetic type of conveyor for separating magnetic objects, such as, cans, caps, nails, screws, bolts, and nuts, sheeting plates and other discarded metallic articles from the main stream of the garbage and dropping them into a metal recovery bin. The separated garbage is transported to a funnel-shaped inlet hopper of a power operated shredder for reducing the size of garbage material and for homogenizing the garbage by commingling the various materials. The homogenized garbage is taken from the outlet of the shredder and is deposited onto a moving conveyor belt. The conveyor belt passes beneath a combustible waste dispensing hopper which is selectively controlled to dispense the combustible waste onto the conveyor belt to mix with the homogenized garbage. The combustible waste mixture is fed into a receiving chute which supplies the garbage to the input of a primary vertical compacting roll for squeezing liquid from the garbage and waste and for decreasing the mass of the aggregated homogeneous garbage and waste. The liquid that is forced from the garbage and waste is collected in a catch basin and is piped to the sewage treatment facility. The compacted garbage and waste is funneled into a feeder or feeding device which effectively supplies the compacted garbage and waste into secondary vertical briquetting rolls. The briquetting rolls mechanically compress excessive liquid or water from the incoming garbage and waste and form it into substantially dry stable briquettes. The compressed briquettes are dropped into a storage bin while the expelled liquid flows into a catch basin and in turn to the sewage treatment plant. The briquettes are conveyed from the storage bin and are dropped into a feeding trough. The feeding trough is vibrationally agitated to evenly spread and longitudinally move the briquettes toward the metered exiting edge. The metered edge of the feeding trough overlies the opened rectangular top of a filtering tank which includes a lower tapered portion. The lower tapered portion constructed with rows and columns of minute holes or apertures simulating a screen or sieve. Initially, the filtering tank is filled to a predetermined level with the briquettes which is monitored by a suitably internally located filter medium level detector. When the level of filter medium is substantially at the set level, an incoming sewage line is opened and raw sewage flows into the filtering tank. The filtering briquettes or filter medium operate and function as a filter bed and acidifier for separating the solids and sludge and for acidifying the normal alkaline sewage water for precipitating the disolved phosphates from the onflowing raw sewage. The filtered sewage water seeps through the filtering medium and flows through holes in the bottom portion of the tank and is caught by a basin which is disposed beneath the filtering tank. The discharged water is sufficiently clean enough to be directly piped to the settling ponds of the sewage treatment facility. As the filtering action continues the entrapped sewage residue will begin to clog the filtering medium so that the liquid level will start rising in the tank. When the water level reaches the liquid sensing detector, a screw type of motor driven transport auger located in the apex region of the bottom tapered portion is energized in order to remove the expended and clogged filtering material from the filter tank. The expended filtering material is transported into a power driven ejection extruder. The extruder compresses and forms the auger transported expended filtering material into suitable cylindrical pellets or the like. The extruded pellets are deposited into a portable type of moving belt conveyor which lifts and drops the pellets into the pellet dispensing hopper. When this hopper is filled with pellets the portable conveyor is moved in order to divert the pellets into a processed pellet storage bin for subsequent use. Combustible waste material, such as, discarded coal washings or fines, is delivered by truck and is dumped into the waste receiving hopper. The hopper is provided with a side mounted vibrator to agitate and freely feed waste material to the gate controlled discharge chute. The discharge chute controllably supplies waste material to the waste dispensing hopper which is disposed adjacent the pellet dispensing hopper. After the refuse and garbage trucks are finished delivering for the day or during lull periods between deliveries, the processing system is converted into a fuel making facility by shutting off the supply of refuse by closing its discharge gate and by deactivating its vibrator. The magnetic separating conveyor and the shredder are turned off by switches on a control console. After the remaining homogenized garbage and waste on the conveyor has passed through the briquetting rolls, the discharge door of the pellet dispensing hopper is opened so that pellets and waste from the waste dispensing hopper are mixed on the conveyor belt. The sewage effluent continues to flow into the filtering tank and briquettes are conveyed from the briquette storage bin and are controllably fed into the filter tank via the feeding trough. The power to the motor of the transport auger remains intact so that the extruder continues to produce pellets which are conveyed to the pellet dispensing hopper or pellet storage bin. At the same time, a feeding trough is shifted adjacent the outlet of the briquette rolling mill and the vibrator of the feeding trough is energized. That is, the portable inclined conveyor is selectively and alternately moved so that its upper discharge end is either disposed over the open top of the processed pellet storage bin or is positioned over the top of the processed pellet dispensing hopper to replenish the pellets. When the bottom discharge doors of the dispensing hoppers are opened and their vibrators are energized, the processed pellets and coal waste are mixed and evenly distributed across the moving conveyor belt. The combined pellets and coal fines are fed into the compactor receiving chute which supplies the compacting rolls. In the interim, the drive motor of the coal washing conveyor is energized and the discharge door of the combustible waste receiving hopper is opened and its vibrator is energized so that coal washings are conveyed to the waste dispensing hopper. The primary rolls compact and compress the pellets and washings together and any water expelled is caught in the basin while the compacted material is funneled to the feeder of the secondary briquetting rolls. The mechanical compressive forces and the high heats of compression of the briquetting rolls remove excessive water from the combined pellets and washings and form it into very stable substantially dry briquettes which are dropped into the feeding trough that has been moved adjacent the outlet of the secondary rolling mill. With its vibrator energized, the feeding trough conveys the briquettes to a fuel storage bin from which briquettes may be trucked to a solid fuel burning facility.

Obviously the fuel briquette processing operation may readily be reverted to the refuse and waste briquetting and pelletizing operation when garbage and refuse deliveries resume the following day to again produce a reserve of pellets for subsequent use in fuel making operation.

BRIEF DESCRIPTION OF THE DRAWINGS

The foregoing objects and other additional features and advantages of this invention will become more readily evident from the ensuing detailed description when considered in conjunction with the accompanying drawings wherein:

FIG. 3 is a schematic illustration of a slightly modified embodiment of the present invention.

DESCRIPTION OF THE INVENTION

Figures 1, 2:
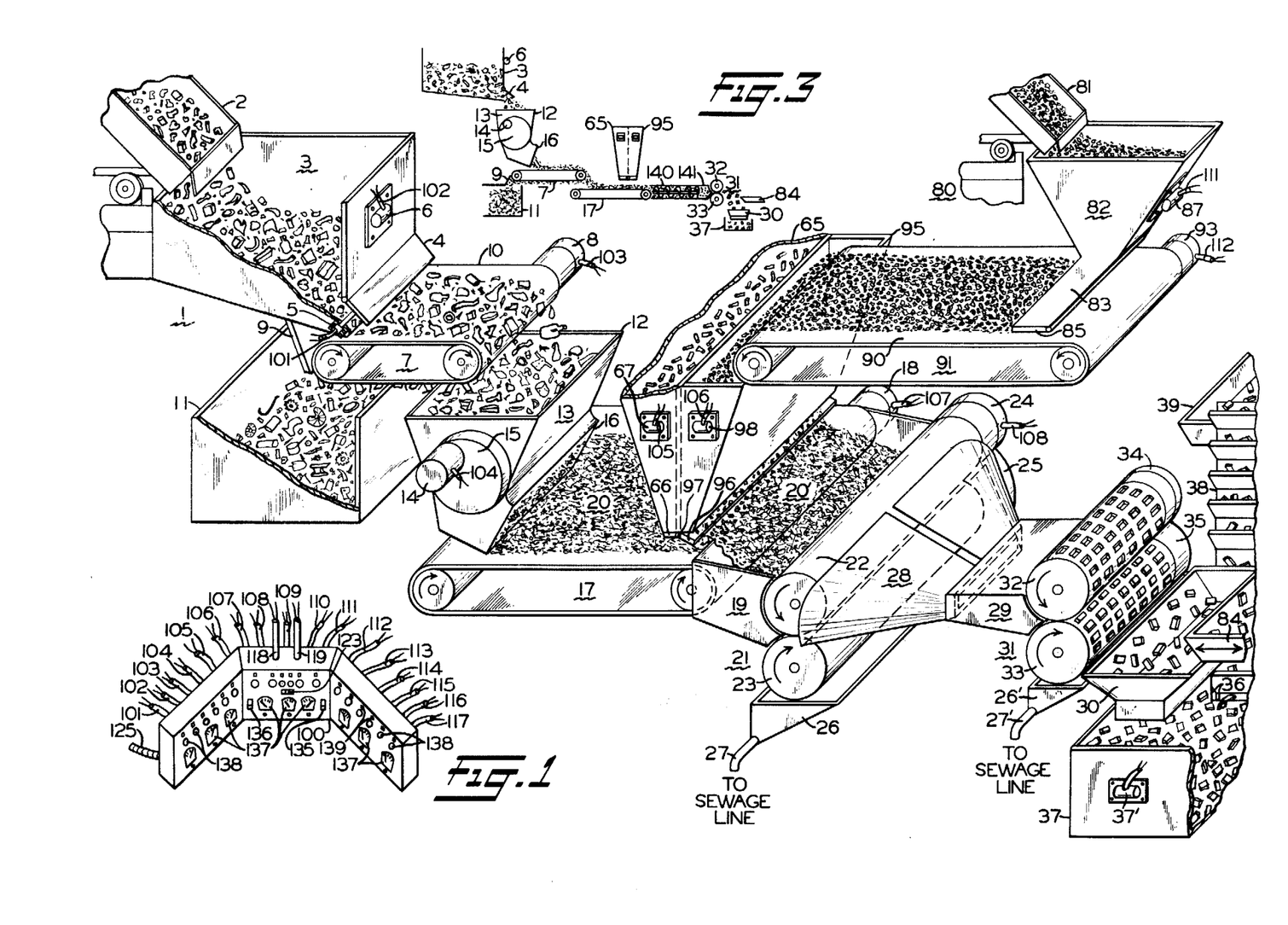
FIG. 1 is a schematic perspective view, partly broken away in section, of the apparatus located at the forward end of the garbage, sewage and waste processing system of the present invention.
FIG. 2 is a schematic perspective view, partly broken away in section, of the remaining apparatus which is used with the apparatus of FIG. 1 and forms the rearward portion of the processing system of the present invention.
Figure 2:
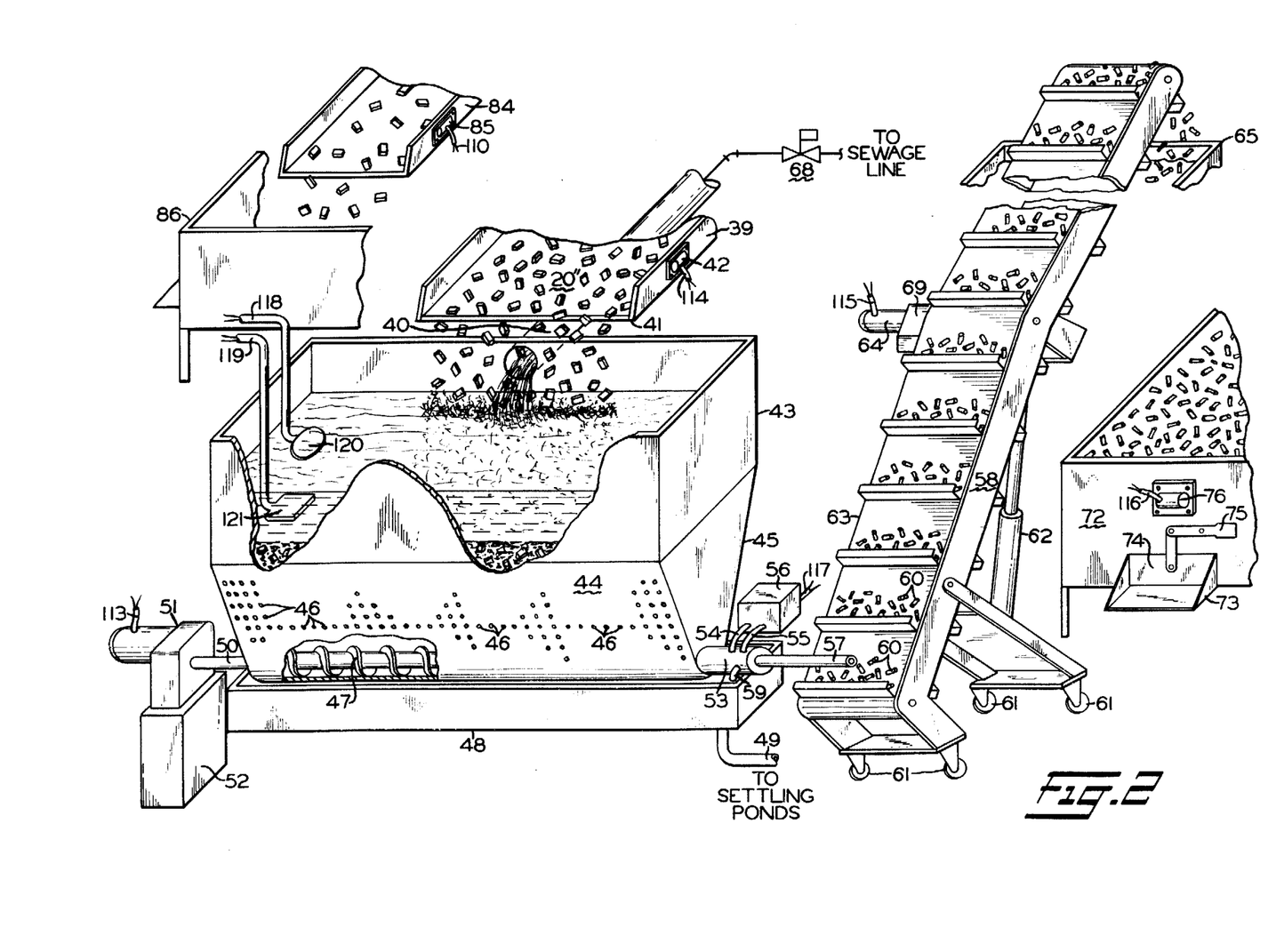

Referring now to the accompanying drawings and in particular to FIG. 1, there is shown a refuse receiving station 1 wherein collected refuse in the form of garbage, trash, rubbish, debris, and the like is delivered by scavenger or refuse collection truck 2. The municipal sanitary collection truck 2 is backed into the delivery entrance, and the load of refuse or garbage is dumped into receiving collection bin 3. The bin 3 is a prefabricated box-like container constructed of a suitable metal, such as heavy gauge sheet steel. The floor of the bin 3 drops slightly to allow the refuse to move forward and toward pivotally movable discharge door 4. The door 4 is selectively opened and closed by a power operating mechanism, such as, an electrical solenoid operator 5. A power operated vibrating device 6 is mounted on the front of the bin 3 to shake and cause the refuse to flow freely from the bin 3 when the door 4 is opened. The free flowing refuse from bin 3, which is heterogeneous in form, includes paper, plastic, leather, rubber, textiles, branches, leaves, wood, grass, plants and clippings, food waste, glass, ceramics, sand, stone, masonary, metals, dirt, and other extraneous matter. This refuse from bin 3 falls onto the top surface of the endless belt 10 of an electric motor driven magnetic conveyor 7. The belt of conveyor 7 is driven by a variable speed electric motor 8 to transport the heterogeneous refuse to the remote gravity release point for the nonmagnetic heterogeneous refuse which is in fact the terminus line located on the driven roller of the conveyor 7. The magnetic objects, such as, tin cans, jar lids, pots, utensils, nails, bolts, nuts and other discarded ferrous articles cling to the belt 10 of the magnetic conveyor 7 and thus are returned toward the nondriven roller located near the door opening of bin 3. The magnetically attracted articles are physically detached from the underside of the belt 10 of conveyor 7 by deflection or baffle plate 9 mounted to the underside of bin 3. The free end of plate 9 contacts and knocks off the magnetically attracted articles into a suitable metal recovery bin 11 disposed beneath the receiving bin and the magnetic conveyor. The heterogeneous refuse released at the terminus point is dropped into a rectangular funnel-shaped integral inlet hopper 12 of a shredder 13. The shredder 13 is driven by an electric motor 14 through a gear train 15 for fragmentizing or reducing the side of the collected refuse and for homogenizing and commingling the various materials into a homogeneous mass. The outlet or discharge opening 16 of shredder 13 is situated above and at one end of an endless belt conveyor 17. Also, a waste dispensing hopper 95, the details of which will be described hereinafter, is disposed above the belt of conveyor 17 and selectively dispenses and mixes a given amount of waste, in the form of coal washings, with passing homogenized refuse. The conveyor 17 is driven by a variable speed electric motor 18 to transport the mixture homogenized refuse and waste to a discharge point. The transported mixture of refuse and waste is fed into a receiving feeder chute 19 which supplies a two-high vertical compacting rolling mill 21 including an upper cylindrical driven roll 22 and lower cylindrical driven roll 23. The primary compaction rolls 22 and 23 are driven by a variable speed electric motor 24 through a gear train 25 so that the loose incoming homogenized refuse and waste are more closely united and consolidated by compressing the homogenized refuse and waste. The compressive forces expell some of the liquid or water from the homogenized refuse and waste. The expelled water flows down the front of rolls 22 and 23 under the force of gravity and falls into a catch basin 26 located beneath the rolling mill 21 and is piped to a convenient sewage trunk or branch line via conduit 27. The outcoming material from rolling mill 21 is compacted, semi-dewatered and flattened. The compacted material is fed into the inlet end of a fold-over type of converging funnel 28. The outlet end of the funnel 28 supplies the compacted refuse and waste matter to a feeding mechanism 29 which is located at the front end of two-high compression vertical briquetting rolling mill 31. The briquetting rolling mill 31, which may be termed a secondary mill, includes an upper cylindrical roll 32 and a lower cylindrical roll 33. The rolls 32 and 33 include indentations or recess portions and matching protruberances or interfitting mating portions. As shown, the recess and protruberance portions are formed on each of the peripheral surfaces of rolls 32 and 33. The briquetting rolls 32 and 33 are preferably driven by a variable speed electrical motor 34 and gear train 35 in a counterclockwise and clockwise direction, respectively, as shown in FIG. 1. The incoming compacted refuse and waste material from the feeding mechanism 29 is further compressed and is formed into briquettes by the high compression rotary rolls 32 and 33. The compressive force of rolls 32 and 33 is sufficiently high to substantially expell approximately 90% or more of the liquid or water content from the incoming refuse and waste material which may have a water content up to 50% by weight. The expelled water is caught by basin 26'. The high heats of compression not only assist in driving off excess liquid from the briquettes but also aid in deodorizing and decontaminating the briquettes. In practice, the briquettes are of a suitable size to be subsequently used as a filtering medium for raw sewage, as will be described in greater detail hereinafter.

The briquettes emerging from rolling mill 31 are dropped into a funnel-shaped collection chute 30 located above the filter briquette storage bin or area 37. The capacity of storage bin 37 is sufficient to hold an amount of filtering briquettes to sustain the filtering of incoming raw sewage for several days or even a week or more The floor of bin 37 is slightly canted toward the exit door open 36 so that the briquettes move forward toward the opening 36. The briquettes are shaken from bin 37 by a variable speed vibrator 37' which is securely fastened to the side of the bin 37. The briquettes are dropped onto the cleated belt of an inclined conveyor 38. The belt of conveyor 38 is driven by a variable speed electrical motor and gear train (not shown). The emerging briquettes are picked up by the cleats of the moving belt and are lifted to the top of conveyor 38. The briquettes are released at the top of conveyor 38 and are dropped into the channel-shaped feeder or feeding trough 39 which is vibrationally agitated to move incoming briquettes forward, as viewed in FIG. 1.

Turning now to FIG. 2 it will be noted that the feeding trough 39 which is broken away in FIG. 1 is shown continued in FIG. 2. In practice, the trough 39 is slightly inclined or tilted forward so that the briquettes or filtering material is advanced toward exiting edge or metering lip 41 under the influence of the agitating action imparted to the trough by a power operated vibrator 42. The metering edge 41 is disposed above the open end of an upper box-like portion 43 of a filtration tank structure 44. The filtration tank 44 includes an upper rectangular section 43 and a lower converging or tapered section 45. The front and back sides of the lower tapered portion 45 include a plurality of suitably sized openings or apertures 46. That is, the front and back surfaces of the bottom portion 45 include a series of rows and columns of minute perforations drilled or punched into the metal plates in any well-known manner. In practice, the minute openings 46 hold back the briquettes or filtering material that is fed into the tank 44 from the feeding trough 39 but effectively permit liquid or water from the incoming sewage effluent to readily flow from the filtration tank 44 into a catch basin 48 located underneath the tank 44. It will be seen that the escaping water falls by gravity into basin 48 and is piped to the settling ponds of the sewage treatment facility via conduit 49.

The raw sewage effluent is supplied to the upper portion of tank 44 via sewage line 40. The sewage line 40 delivers unprocessed sewage on top of the filter bed or filtering medium. The depth of the filter bed or filtering medium and the level of the water in tank 44 are constantly monitored by appropriate sensing and detecting devices, as will be described in greater detail hereinafter.

A screw type of transport auger 47 is suitably disposed inside the lower extremity of the tapered section 45 of the tank 44. As shown in FIG. 2, one end of the auger 47 is journaled in the left end of tapered section 45 and is connected by drive shaft 50 to gear train and variable speed electrical motor 51 which is mounted on supporting stand 52. The other end of transport auger 47 is suitably journaled and is interfaced with an extruding mechanism 53. The screw of the auger 47 is adapted to feed expended filtering material into the cylinder of the extruder 53 which may be either a direct or an indirect type of extruding mechanism 53. The required power or source of energy necessary to move the compression ram of the extruder 53 is supplied by conduits or high pressure hoses 54 and 55 from a suitable source of pressure, such as, an electric motor driven compressor apparatus. A delivery tubule 57 is mechanically connected to the discharge end of the extruder 53 so that extruded pellets 60 are dropped onto a cleated belt type of portable conveyor 58. Excess water from extruder 53 flows into basin 48 via conduit 59. The portable conveyor 58 is supported on wheels or casters 61 which are rotatably attached to an undercarriage support structure (not characterized). The conveyor 58 includes an adjustable hydraulic piston-cylinder assembly 62 to readily permit the angular setting or the degree of inclination and height adjustment of the moving cleated belt 63. The belt 63 is moved by a power pack including a variable speed electric motor 64, a geared speed reducer 69, and an overload release mechanism (not characterized). The extruded pellets 60 are picked up by the upstanding cleats as the belt 63 passes over the lower roller on its upturned swing. The pellets 60 are lifted or carried upward by the cleated belt 63. The pellets are either dropped into a processed pellet dispensing hopper 65 or deposited into accumulation area, such as, pellet storage bin 72 for subsequent use, as will be described hereinafter. The storage bin 72 includes a discharge chute 73 and a vertically movable retractable door 74 which may be manually opened or closed by manipulation of lever linkage 75. Preferably, a power operated vibrator 76 is mounted on the storage bin 72 to agitate and to shake the pellets out of chute 73 when the door 74 is opened during periods of discharge.

Again in viewing FIG. 1, it will be noted that there is a second receiving station 80 where the waste material in the form of coal washings or fines is delivered by a dump truck 81. In the present instance, it will be assumed that truck 81 is dumping coal washings or fines into an open top of waste material storage hopper 82. In the coal field regions of the Mid-Atlantic states coal washings and fines are considered waste and are simply discarded by deep mine operators and above ground strippers. As shown, the coal waste storage hopper 82 includes dependent diverging discharge chute 83. The discharge chute 83 includes a pivotal movable bottom door 85 which is selectively opened and closed by a suitable operating mechanism (not shown). A power driven vibrator 87 is suitably mounted to the hopper 82 for shaking and causing the combustible waste material or coal fines to flow freely from the discharge chute under the influence of gravity. It will be seen that the discharge chute 83 is disposed over one end of a moving belt 90 of conveyor 91. The endless belt 90 is rotatably driven in a counterclockwise direction, as viewed in FIG. 2, by a variable speed power mechanism 93 including an electric motor and speed reducer (not characterized). When the discharge door 85 is opened and the vibrator 87 is energized, the coal fines fall and are distributed onto the moving belt 90 so that the combustible waste is delivered to the previously mentioned waste dispensing hopper 95. The dispensing hopper 95 includes a controllable bottom discharge door 96 which is centrally pivoted about shaft 97 to be incrementally moved between a fully opened and fully closed position by a conventional controllable stepping or operation mechanism (not shown). The dispensing hopper 95 is selectively vibrated by a variable speed vibrator 98 which is fixedly secured to the side wall or surface of the hopper 95. As shown in FIG. 1, the processed pellet dispensing hopper 65 is disposed adjacent and forward of the hopper 95. Like hopper 95, the juxtaposed dispensing hopper 65 includes a separate incrementally controlled pivotal door 66 which is actuated by a suitable stepping operating mechanism (not shown). A variable speed vibrating mechanism 67 shakes and agitates the hopper 65 when the pivotal door is opened so as to cause the pellets to flow freely from hopper 65. The pellets are uniformly and evenly distributed onto the top of the belt of moving conveyor 17, as will be described in greater detail hereinafter.

In viewing FIG. 1, it will be noted that a channel shaped feeding trough 84 is disposed in the vicinity of the exiting end of the briquetting rolling mill 31. The trough 84 is shown in its retracted position, but the trough may be shifted in either direction as shown by the double headed arrow. Turning now to FIG. 2, it will be seen that the remaining portion of trough 84 is continued. The trough 84 is slightly inclined forward so that material moves along the bottom when the trough is shaken by a power driven vibrator 85 which is energized via conductor 110. The discharge end of feeding trough 84 is disposed above the open top of a fuel storage bin 86 where fuel briquettes are deposited for future shipment.

An appropriate control panel or console 100 is suitably located in full view and reach of the operating personnel of the processing facility for monitoring the operation and for controlling the condition of the driving motors, the safety interlocks, the vibrators, the door mechanism and the extruder. The front of the panels of console 100 includes a plurality of switches 139, indicating lamps (not characterized), meters 137 and control dials 138 and individual and master control switches 135, 136 and 123. The backs of the panels accommodate a plurality of electrical conductors 101 through 117 which are connected from the switches, lamps, dials, and meters to the associated motor, vibrator door, operating and extruding mechanisms. Thus, the electrical condition of each device may be readily observed and may be immediately turned off and on as the situation warrants. In addition, the speeds of the conveyors, shredder, rolls and feeders may be changed and varied simply by turning the appropriate control dial on the console 100. As shown, a pair of electrical conduits 118 and 119 accommodate the conductors which interconnect the control console with the liquid level sensing device 120 and the filtering material depth device 12. It will be noted that devices 120 and 121 are commercially available sensing and detecting mechanisms which are located inside the tank 44, as shown in FIG. 2. Electrical power is supplied to the control console 100 via cable 125 which is connected to a suitable source of alternating current voltage, such as, conventional 220 or 440 volt a.c. voltage supply.

Let us now assume that it is the time of day when municipally collected refuse is being delivered at the receiving station 1. As noted above, the scavenger trucks 2 file into station 1 and sequentially dump their accumulated heterogeneous refuse loads into the collection bin 3. It is conventional for local municipal sanitary department and/or for a contracted refuse collection company to pick up and collect refuse from residential areas, industrial and commercial sites and governmental installations on a daily, biweekly or weekly basis. The collected refuse takes the form of garbage, rubbish, trash, dregs, leavings, debris, and the like. The sampling of one locale showed that municipally collected refuse contained the following constituents:

| Substance | Percentage |
|---|---|
| Paper | 42.0 |
| Wood | 2.4 |
| Grass | 4.0 |
| Brush | 1.5 |
| Greens | 1.5 |
| Leaves | 5.0 |
| Leather | 0.3 |
| Rubber | 0.6 |
| Plastic | 0.7 |
| Oil and Paint | 0.8 |
| Linoleum | 0.1 |
| Rags | 0.6 |
| Street Sweepings | 3.0 |
| Dirt | 1.0 |
| Garbage and Fats | 12.0 |
| Ashes | 10.0 |
| Metals, Glass and Ceramics | 14.0 |
| Unclassified Misc. | 0.5 |
| Total | 100.0 |

This analysis of average municipal refuse study was made by Purdue University in 1969. It has been found that in a typical community an average individual generates approximately 7 pounds of household refuse per day. Thus, a community of 100,000 residents will produce nearly 700,000 pounds or 350 tons of refuse each day of the year. Hence, a 350 ton facility is capable of handling the refuse produced by inhabitants of cities the size of Harrisburg, Penna.; San Jose, Calif.; and similarly populated municipalities.

At the present time, our coal resources are still the most abundant supply of fossil fuel energy; however, in the past decade the use of coal as a source of fuel or combustible energy has dwindled significantly due to the recently enacted clean air standards and particularly due to the recent enforcement of these acts and other established laws and ordinances. The excessive emission of smoke, sulphur dioxide, fly ash, unburnt hydrocarbon and other pollutants due to burning dirty or high-sulpher coal is clearly in violation of many local ordinances and/or state and federal antipollution acts and statutes. With the exception of sulphur or sulphur dioxide emission it is physically possible, even though not economically feasible, to stay within the limits of the clean air standards by employing scrubbers, precipatators, and other cleaning apparatus to remove dust, dirt, and carbon particles from being emitted into the atmosphere. In order to economically meet the sulphur emission standards, it has been necessary for the coal consumers to burn low-sulphur content coal or convert their facility to a gas or oil burning plant. However, with the energy crisis the supply of fuel oil will soon be unable to meet the demands so that consumers, particularly power companies, will require an alternte or substitute type of fossil fuel.

Prior to or simultaneous with the delivery of the collected refuse by truck 2, loads of waste material in the form of nonuseable dirty high-sulphur crushed coal or discarded coal washings or fines are delivered to station 80 via truck 81. The trucked-in coal waste is dumped into storage bin 82 and is conveyed to the hopper 95 via chute 83 and conveyor 91. When the coal storage hopper 95 is filled to capacity the discharge door 85 is closed and the vibrator 87 is deenergized until it is necessary to replenish the hopper 95.

Normally, the facility is started up by the operating personnel by simply turning on master control switch 123 which energizes the various motors, vibrators, feeders and conveyors to process the refusee and sewage into processed pellets 60. The actuation of switch 123 results in the opening of the discharge door 4 by energizing the mechanism 5 via lead 101 and by energizing the vibrator 6 via lead 102 so that the refuse begins to drop onto the belt 10 of the metallic separating conveyor 7. The magnetic or ferrous objects such as cans, rods, fences, sheet metal, nails, pins, bolts, nuts, pots, utensils, etc., are attracted by a powerful pickup magnet or magnets so that they are readily attracted and cling to the outer surface of moving belt 10. The paper, plastic, wood, leather, textile, grass, greens and other nonmagnetic objects deposited onto the belt 10 are carried to a discharge point which in this case is the motor driven roller end of the conveyor 7. The attracted magnetic objects simply move about the end roller and are returned by the underside of belt 10 to the front or idler roller of conveyor 7. As the belt 10 passes around the underside of front or idler roller, it comes in close proximity to the free end of baffle plate 9 which dislodges the magnetic objects from the outer surface and knocks them into recovery salvage metal bin 22 where they are subsequently reprocessed in a steel making facility or mill. There is approximately 5% of recoverable ferrous metal in the collected refuse so that in each ton of refuse there is nearly 100 pounds of scrap metal.

The nonmagnetic refuse matter falling off the right end of conveyor 7, as viewed in FIG. 1, drops into the open end of a funnel-shaped receiving hopper or rectangular container 12 of shredder 13. The incoming refuse is contacted by the commingling cutters or shredding blades which are driven by rotary motor 14 through gear train 15. The cutting blades of shredder 13 reduce the size and commingle the incoming heterogeneous refuse material into pulverized homogeneous matter so that the homogeneous matter is discharged from outlet chute 16 of shredder 13. The discharged homogenized refuse matter 20 is evenly distributed and deposited onto the endless moving belt of motor driven conveyor 17. As the homogenized refuse 20 passes under the hopper 95 a select amount of coal washings or waste is dropped through the open door 96 onto the moving belt of conveyor 17. The waste is evenly dispersed along the width of the conveyor belt so that a congruous mixture results. It will be appreciated that the amount of waste released from hopper 95 and mixed with the refuse is dependent upon the degree of alkalinity of the raw sewage effluent which is to be treated during filtration. The mixture of homogenized refuse and waste 20' is transported by the moving belt of conveyor 17 into the inlet opening or feeding mechanism 19. The feeder 19 supplies the homogenized refuse and added waste 20' to the primary compression rolling mill 21. The incoming homogenized refuse and waste material 20' is relatively fluffy and normally contains a substantial amount of fluid or moisture. The fluffy refuse material is mechanically compacted and compressed by the two-high vertically-aligned rolls 22 and 23 of mill 21. As the material 20' passes through the rolls, excess liquid or waste is squeezed out by the pressure exerted by the upper and lower rolls. The expelled liquid freely flows down the face of the bottom roll into catch basin 26. The collected water is piped from basin 26 by line 27 to a convenient tapin point-such as, a trunk or branch line leading to the sewage treatment facility. The compressed and flattened homogeneous refuse coming out of rolling mill 21 is fed into the large opening or inlet of converging trough or fold-over funnel 28. The small opening or outlet of converging funnel 28 communicates with the inlet of the feeding device 29, The feeding device 29 supplies the compacted homogenized refuse and waste to the secondary high compression briquette rolling mill 31. As shown, the rolling mill 31 includes a pair of vertically aligned two-high rolls 32 and 33. As previously mentioned, the outer or peripheral surfaces of rolls 32 and 33 are provided with a plurality of indentations or recesses along with interfitting protruberances or bosses which form the incoming refuse into briquettes or brick-like objects 20''. The high heats of compression of the briquetting rolling mill are sufficient to drive off most of the remaining excess water and moisture from the fabricated briquettes. The liquid freely flows down into catch basin 26 which is connected to the above-mentioned sewage line via pipe 27'. The pressure and temperatures experienced during the briquetting process not only dewater but also sterilize the briquettes 20'' so that the pathogenic organisms or contagious bacteria is completely destroyed. Thus, the briquettes are quite stable and are not subject to decomposition so they may be readily stored for long lengths or periods of time.

As shown, the discharged briquettes 20'' drop into the funnel-shaped collection chute 30 which is shown disposed adjacent the outlet side of briquette rolling mill 31. In viewing FIG. 1 it will be noted that the chute 30 is disposed above the filtering briquette storage bin 37. As previously mentioned, the discharge door opening 36 is located adjacent the lower end of the cleated belt of conveyor 38 so that the filtering briquettes are freely discharged under the influence of the variable speed vibrator 37'. The vibrator 37' is controllably energized and the briquettes are lifted by the cleats of conveyor 38. The briquettes 20'' are dropped into the feeding trough 39 and are moved forward under the agitating action of variable speed vibrator 42 toward the metering edge 41. The speed of movement and in turn the amount of briquettes falling over metering edge 41 are controlled by varying amplitude and frequency of the electrical pulses applied to vibrator 42 from control console 100 via conductor 114. Thus, the filtering briquettes are controllably dropped into filtration tank 44 to form a filtering medium. The filtering medium takes the form of a filter bed which is kept at a substantially predetermined depth or thickness by detector 121. The upper level of the filter bed in tank 44 is constantly sensed by detector 121 so that the amount of incoming briquettes may be increased or decreased by varying the vibrational speed of vibrator 42. As the filtering briquette medium is dropped into tank 44, raw sewage is permitted to enter tank 43 via the sewage inlet line 40 which is located near the upper end of the filtration tank 44. The rate of flow of the effluence is regulated and controlled by an automatic motor driven gate valve 68 as schematically illustrated in FIG. 2. The liquid level in tank 44 is constantly sensed and is controlled by sensing device 120.

The sensing device 120 is connected to the control console 100 via conduit 118 so that when the liquid level reaches the senser a signal is transmitted to the console to take appropriate action. It has been found that the increased usage of laundry and cleaning detergents, particularly by housewives, has caused unusual amounts of dissolved phosphates and other salts to be added to domestic raw sewage. The dissolved salts in the sewage water are expensive and are difficult to remove in the conventional types of sewage treatment plants at the present time. In the present operation, the dissolved phosphates and salts are precipitated out of the sewage water by the acidity added by the coal waste to the filtering briquettes or medium 20″. The precipitated salts and the solids, as well as the fats, oils and other matter in suspension contained by the raw sewage effluent, are entrapped in the filter bed while the water readily passes through the filter bed and flows out of holes 46. The filtered water or effluent is in a semi-pure state and may be directly piped from catch basin 48 to the settling ponds of the sewage treatment plant. The filtering operation dispenses with and avoids the need of grit bars, grease traps and a large part of the primary filtration equipment that are normally required by present-day sewage treatment facilities. As the sewage effluent continues to be filtered, the filtering medium begins to be clogged up by the extraneous matter so that the water level in tank 44 will rise and will be sensed by detector 120. The sensing detector 120, and a signal are imparted to control panel 100 via lead 118 which immediately causes the energization of drive motor and gear train 51 via conductor 113. Thus, angular rotation is imparted to the drive shaft 51 and the auger screw 47 begins to revolve. THe turning of auger 47 results in the transportation and withdrawal of the clogged or expended filtering medium from the bottom of tank 44.

It has been found that the angular velocity of the rotating auger 47 is regulated to allow for continuous operation. Preferably during normal operation a state of equilibrium is established wherein the incoming filtering medium, namely, the filtering briquettes plus the entrapped material of the raw sewage effluence is substantially equal to the amount of the clogged or expended filtered material that is withdrawn from the tank 44 by transport auger 47. As mentioned above the water passes through apertures 46 and is caught by basin 48. The state of equilibrium is readily achieved by modulating the rpm of auger drive motor 51, by controlling the vibrational speed of vibrator 42 and by regulating the rate of flow of the incoming raw sewage by motorized valve 59. Thus, the detectors 120 and 121 constantly monitor the level of the water and the height of the filter bed in tank 44 so that the operation is continuous. The expended or clogged material is fed into extruder 53 by the rotating auger screw 47. For the purpose of convenience, the extruder 53 is powered by a source of fluid pressure 56 including a compressor which is driven by an electric motor energized via conductor 117. The pressure is supplied to extruder 53 via conduits or hoses 54 and 55 so that the internal extruding ram is reciprocated within the cylinder housing. The reciprocating movement of the ram forces cylindrically shaped pellets 60 out of discharge tubule 57. The extruded pellets 60 drop onto the cleated belt 63 of portable conveyer 58. The moving belt 63 is driven by electrical motor 64 which is energized from the control panel 100 via conductor 115. In viewing FIG. 2, it will be noted that the semi-dry or slightly moist pellets are picked up by the cleats of the moving belt 63 and are dropped into the open top of dispensing hopper 65. If and when the dispensing hopper 65 is filled to capacity, the conveyor 58 is moved and its top end is lowered by contraction of the hydraulic ram 62 so that the cylindrical pellets 60 will then be dropped into pellet storage bin 72 for subsequent use, as will be described presently.

The production of the filtering briquettes will normally continue until substantially all of the refuse in receiving bin 3 is separated, shredded, mixed with waste, compressed and briquetted. When it is desired to stop the filtering briquetting process, the door 4 to bin 3 is closed and vibrator 6 is deenergized via control console 100. The motors 8 and 14 of conveyor 7 and shredder 13 are also deenergized at this time. Generally, the homogenized refuse 20 and the waste metered from hopper 95 remaining on conveyor 17 is compressed by rolling mill 21, briquetted by briquetting mill 31 and dropped through chute 30 into storage bin 37. When the last of the briquettes are produced by rolling mill 31, the door 66 of hopper 65 is opened, the vibrator 67 is energized via conductor 105, and the feeding trough 84 is shifted to the left, as viewed in FIG. 1. At the same time the vibrator 85 is energized from the console 100 via conductor 110. The drive motor of mechanism 51 remains energized via conductor 113, and the motor of fluid pressure source 56 remains energized via conductor 117 so that the extruder 53 continues to produce pellets 60. The upper end of extruder 53 is raised and is positioned over the open top of dispensing hopper 65 as shown in FIG. 2. Thus, the filtering process of the raw sewage continues while the filter briquetting process is temporarily discontinued. As previously mentioned, there is a sufficient supply of filtering briquettes in storage bin 37 to maintain an around-the-clock filtering of the incoming raw sewage effluence so that the processed pellets 60 are directly conveyed from extruder 53 to hopper 65. However, in cases of breakdown of the raw sewage filtration mechanism or cessation of incoming raw sewage the processed pellets may be obtained from storage bin 72. Under this condition the lower end of the conveyor 58 is moved and positioned beneath discharge chute 73 of pellet storage bin 72 while the upper end of conveyor 58 remains raised by ram 62 and continues to be positioned above the open top of processed pellet dispensing hopper 65, as viewed in FIG. 2.

Since the door 66 of pellet dispensing hopper 65 is pivotally opened and vibrator 67 is energized via conductor 105, the processed pellets are evenly distributed onto the moving belt 63 of conveyor 17. Similarly, since the door 96 of waste dispensing hopper 95 has been pivotally opened and the vibrator 98 has been energized, coal fines are evenly intermingled with the pellets on the moving belt of conveyor 17. The commingled mixture of pellets and fines is fed into feeder 19 which supplies rolling mill 21. The incoming mixture is compacted by compression rolls 22 and 23 and excess water flows from basin 26 through pipe 27 to the sewage line. The emerging compacted pellet and coal fine material is supplied by the fold-over funnel 28 to the feeding mechanism 29. As mentioned above, the feeder 29 feeds the pellet and coal fine material into the briquette rolling mill 31. Again the high compression rolls 32 and 33 force out any excess moisture so that relatively high heats of compression produce stable and firm briquettes. The briquettes are durable and are suitable for long periods of storage under normal conditions. Again the high heats of compression of rolling mill 32 result in a sterilizing effect which destroys most, if not all, pathogenic bacteria which may have been reactivated in the refuse briquettes or which may have been picked up during filtration and pelletization operation. Thus, the fuel briquettes are free of organisms and contagious bacteria and, therefore, the briquettes will not decompose when properly stored. The emerging fuel briquettes are dropped into the feed trough 84 which has been shifted adjacent the outlet of the briquetting rolling mill 31. The agitating action imparted to the feeding trough 84 from the vibrator 85 causes the fuel briquettes to move forward toward the discharge edge or outlet of feeder 84. The fuel briquettes are dropped into storage area or bin 86 for storage and subsequent loading and removal by a suitable conveyance to a solid fuel burning facility, such as, a steam generating power plant, an industrial or commercial heating complex, and the like. As previously mentioned, the solid fuel briquetting process normally takes place during the off-hour refuse delivery periods and may terminate upon resumption of refuse deliveries. The fuel briqette-making operation is normally stopped by closing the doors 66, 96 and 85 of hoppers 65 and 95, and bin 82, respectively, by turning off vibrators 67, 98 and 87. After the pellets and coal fines pass through feeder 19, compacting roll funnel 28, feeder 29 and are briquetted by rolling mill 31, the feeder 84 is shifted away from the outlet of briquetting rolling mill 31, and the feeding vibrator 85 is deenergized via conductor 110. Thus, the system and apparatus are again made ready for the refuse separating, shredding and the refuse and waste briquetting, filtering and pelletizing operation. The door 4 of the refuse receiving bin 3 is opened by mechanism 5 which is energized via conductor 101 so that refuse material is shaken out onto belt 10. Along with energization of vibrator 6, the drive motors 8 and 14 of the conveyor 7 and the shredder 13 are energized. When the shredded refuse carried by the belt of conveyor 17 reaches the proximity of hopper 95, the door 96 is opened and vibrator 98 is energized so that a metered amount of coal waste is again mixed with the refuse material. If need be, the lower end of conveyor 58 may be moved and returned adjacent to the output pipe 57 of extruder 53, as viewed in FIG. 3.

It will be noted that the control console 100 includes a master control switch 135 for starting and stopping the pellet processing operation and a master control switch 136 for starting and stopping the solid fuel processing operation. The master control switch 123 disables the entire facility for serving and maintenance periods or complete shut down times. The face of the control console includes meters 137 for indicating the speed or the revolution per minute (rpm) of the various drive motors and frequency of vibrations of the vibrators. The control knobs or dials 138 are utilized for adjusting the vibrator frequencies and the motor speeds. The individual on-off switches 139 selectively turn on or turn off the various electrical devices.

Turning now to the filtering operation, it will be appreciated that the given amount of coal or waste added from hopper 94 to the homogeneous refuse is basically dependent upon the akalinity of the incoming raw sewage effluent entering tank 44 from inlet pipe 40 at any given time. Generally, the pH factor of average domestic sewage varies between 7.5 to 8.5, and it has been found advantageous and desirable to have the water or clarified liquid effluent issuing from filtering tank 44 slightly acidic in order to allow for further precipitation to occur in the settling ponds prior to releasing the liquid into the waterways. Thus, it is advantageous to carefully meter the coal additive that is released from hopper 95 by regulating the opening of door 38 and varying the frequency and amplitude of vibrational impulses supplied to the vibrator 98. Hence, it is desirable to constantly monitor or periodically sample the emitted filtered water in basin 48 to determine the pH factor and in turn to regulate the amount of coal fines being released from hopper 95. Hence, it is understood that an increase in the alkaline reading of the filtered sewage water is immediately accompanied by an increase in the amount of coal fines being metered from the storage hopper 95. Conversely, a decrease in the alkalinity of the filtered sewage water results in the direct reduction of the amount of coal fines being metered from the hopper 95. It will be appreciated that the added coal fines and entrapped sewage constituents also function to improve the combustibility of the pellets 60 by increasing the overall B.T.U. value.

It will be appreciated that the waste additive of the filter medium, namely, the coal washings or fines, or the pulverized dirty coal contains sulphur which must be carefully considered in the solid fuel briquetting operation. The Clean Air Pollution Act of 1972 and other state and local laws restrict the burning of fuel, such as, coal, oil or the like, which has a sulphur content of less than 1.7 percent. The percentage of coal mixed with the processed pellets to form the solid fuel briquettes is carefully measured and analyzed; there is no difficulty in complying with most stringent sulphur limitations now in effect since the coal additives only form a minor part of the fuel briquettes. Hence, the amount of waste material added to the passing pellets released from hopper 65 is carefully metered by controlling the size of the door opening of hopper 95 and the agitating action of vibrator 98. While it is advantageous to add as much coal waste as possible to the processed pellets in order to materially increase the B.T.U. value of the solid fuel briquettes, it is advisable to periodically test and measure the sulphur content of the fuel briquettes in order to ensure that the emission standards within a given locale are met. Generally, the sulphur content of the coal waste does not restrain the possibility of obtaining the desired combustible quality of the solid fuel briquettes which reaches approximately 8,000 B.T.U. Per lb. so that the release of sulphur dioxide by subsequent burning is well within the limits of even the most restrictive acts or ordinances.

Turning now to FIG. 3, there is shown a partial schematic diagram of a slightly different or modified version of a portion of the present invention in which like elements or devices are represented by identical numerals as those of FIG. 1. In FIG. 3, the heterogeneous received refuse is agitated by vibrator 6 so that it moves forward through the open door of bin 3. In this embodiment the refuse falls directly into the receiving chute 12 of shredder 13 and is comminuted by the internal cutting blades which are rotatably driven through gear train 15 by electric motor 14. The shredded or pulverized refuse is emitted from discharge chute 16 onto the upper surface of the clockwise moving belt 10 of magnetic separation conveyor 7. The refuse is conveyed to the right, as viewed in FIG. 3, wherein the nonmagnetic particles fall off the end of conveyor 7 onto the upper surface of the moving belt of conveyor 17 while the magnetic particles cling to the moving belt of conveyor 7 and are deflected into a scrap bin 11 by a wiper plate or deflector 9 mounted on the top of bin 11. The homogenized nonmagnetic refuse particles are carried by conveyor 17 into a conventional screw type of conveyor compactor 140. The conveyor compactor reduces the fluffiness of the comminuted refuse and transports it to an extruding type of feeding spout 141. The wide mouth of spout 141 is disposed adjacent the inlet side of the two-high rolling mill 31 having upper briquetting roll 32 and lower briquetting roll 33. As shown, the funnel 30 is disposed adjacent the outlet side of rolling mill 31 to direct the filtering briquettes into the filtering medium storage bin 37. Like in FIG. 1, a vibrational fuel feeding trough 84 is located in the vicinity of the outlet of briquetting rolling mill 31. Thus, the trough 84 may be quickly shifted adjacent the outlet of briquetting rolling mill 31. Thus, the trough 84 may be quickly shifted adjacent the outlet of the mill 31 to collect the fuel briquettes and divert them to the fuel storage bin. The remaining structure and mechanism of FIG. 3 are substantially identical to that of FIG. 1, namely, the dispensing hoppers 65 and 95, the vibrators and the discharge door (not characterized), associated structural features, and the functional operation of FIG. 3 are substantially the same as those previously shown and described with regard to FIGS. 1 and 2.

While this invention has been described with respect to the coal fields of the Mid-Atlantic states in particular wherein anthracitic and bituminous coal washings and fines are in plentiful abundance, it is understood that the invention may be practiced in other locales or regions of this country or in any other country of the world where access to the fuel or coal waste, remanents or the like is readily available. In addition, it is understood that other types of fossil fuels, such as lignite, peat, semi-anthracite or semi-bituminous coals, or even petroleum byproducts may be used in practicing this invention. Likewise, animal waste, such as sheep, cow, horse, or cattle manure, or the like may be substituted and used in place of the coal waste with substantially equal results.

From the foregoing it will be seen that the presently described invention provides a new and improved process and arrangement for handling refuse, treating sewage effluence and utilizing waste to form a useable solid fuel or a source of useful energy. It will be appreciated that the subject invention provides a unique method of combining refuse, sewage and coal fines in a stable fuel, thereby preventing land, air and water pollution of our milieu. Thus, it is to be recognized that a significant contribution has been made to the problem of overall pollution, particularly with respect to the everyday living of man. Hence the present invention provides a unique way of avoiding present and future pollution of our land, water and air by using the contaminants as a source of much needed energy. Further, it is understood that various changes, modifications, and substitutions may be made without departing from the spirit and scope of this invention. The shredder is only representative of one type of masticating or comminuting device for size reduction purposes, and it is understood that equivalent mechanisms, such as, hammer mills, grinders, choppers, etc. may be used in practicing the invention. The shape of the processed pellets and the filtering and fuel briquettes may be cylindrical, cubicle, spherical tubular, triangular and the like. The size of the pellets and briquettes may be varied in accordance with the needs of the filtering apparatus and fuel burning equipment. It will be appreciated that the feeding troughs may be replaced by moving belt conveyors or the like and vice versa. The electrical vibrators may be replaced by pneumatic or hydraulic types of agitators. In addition it is understood that one or more filtration tanks may be used in cases of where the volume of raw sewage effluence increases or exceeds calculated expectations. Also a standby filtering tank may be used in cases of emergency, such as, an uexpected breakdown breakdown of the normal filtering tank or in supplementing the primary filtering tank during excessively heavy sewage reception periods that occur during spring thawing or during heavy rain storms. Further, it is understood that another set of briquetting rolls may be separately used to dewater and form the pellets and waste into the fuel briquettes, so that pellet filtering briquettes and fuel briquettes may be continuously produced where refuse and garbage are delivered or collected the major portion of the day or 24 hours a day. The two-high rolls may be replaced by four-high or cluster rolling mills which require increased compressive forces or better results are obtained. Thus, these changes and other additions and modifications may be made in accordance with the teachings advanced in the subject invention.

As will be evidenced from the foregoing description, certain aspects of this invention are not limited to the particular details of the construction and arrangement as illustrated, and it is contemplated that other modifications, variations and alterations will occur to those skilled in the art. It is, therefore, intended that the appended claims shall cover such changes and deviations that do not depart from the true spirit and scope of this invention.

Having thus described my invention what I claim as new and desire to secure by Letters Patent is:

1. Apparatus for handling refuse and waste and for treating sewage influent comprising, means for homogenizing said refuse and for adding waste to said refuse, means for forming said refuse and waste into a filtering medium, and means for passing said sewage influent through said filtering medium whereby solds, matter in suspension and precipitates are separated from the sewage influent.

2. The apparatus, as defined in claim 1, wherein a separator means is used to remove metallic objects from said refuse.

3. The apparatus as defined in claim 1, which further comprises masticating means for reducing the size of said refuse.

4. The apparatus as defined in claim 1, wherein vertical rolls compress and dewater said refuse.

5. The apparatus as defined in claim 2, wherein said separator is a magnetic mechanism for removing ferromagnetic metals from said refuse.

6. The apparatus as defined in claim 1, wherein the refuse is delivered into a receiving bin which supplies said refuse to a magnetic separator for dissociating the ferromagnetic objects from the main stream of said refuse which is fed to a reduction mechanism for decreasing the size and commingling said refuse and which in turn is fed into compacting and compressing rolls for dewatering said refuse.

7. The apparatus as defined in claim 1, wherein a perforated receptacle is employed for receiving said filtering medium and said sewage influent.

8. The apparatus as defined in claim 7, wherein the liquid portion of said sewage influent passes through the perforations and the remaining portion of said sewage influent is combined with said filtering medium.

9. The apparatus as defined in claim 8, wherein the combined matter of the remaining portion of said sewage influent and said filtering medium is controllably moved from said receptacle means for compaction.

10. The apparatus as defined in claim 9, wherein the compacted matter is moved to storage means.

11. An arrangement for processing refuse, sewage and waste material comprising, means for receiving collected refuse material, means for masticating and for separating metallic objects from said collected refuse material, means for mixing waste with said masticated and separated refuse material, means for compacting said mixture of waste and refuse and forming it into filtering matter, means for delivering said filtering matter to a filtration means, means for delivering raw sewage to said filtration means whereby solids and matter in suspension are removed from the raw sewage by said filtering matter, means for removing the expended filtering matter from the filtration means, means for dewatering said expended filtering matter, and means for delivering the dewatered filtering matter to storage means.

12. The arrangement as defined in claim 11, wherein said compacting and compressing means include a vertical rolling mill.

13. The arrangement as defined in claim 11, wherein said filtration means includes a tank having a rectangular open top for receiving the filtering matter and a tapered bottom for forming a filter bed.

14. The arrangement as defined in claim 11, wherein said means for dewatering the expended filtering matter takes form of an extruding mechanism which forms it into pellets.

15. The arrangement as defined in claim 13, wherein said tapered bottom of said tank includes a plurality of openings to permit the free flow of water from the raw sewage.

16. The arrangement as defined in claim 11, wherein said waste is acidic coal which causes the phosphates to be precipitated from the raw sewage.

17. The arrangement as defined in claim 11, wherein said means for removing the expended filtering matter is a transport auger mechanism which is adapted to feed said dewatering means.

18. The arrangement as defined in claim 17, wherein a sensing means is located in said filtration tank for sensing the level of liquid in said filtration means and controlling the operation of said screw auger mechanism.

19. The arrangement as defined in claim 13, wherein a sensing means is located in said filtration tank for sensing the depth of said filter bed.

20. The arrangement as defined in claim 11, wherein means are provided for removing said dewatered filtering matter from said storage means and mixing additional waste therewith and passing the mixture of said waste and said filtering matter through said compacting and compressing means for producing solid fuel products having a heating value of approximately 8,000 B.T.U.'s and a moisture content of approximately ten percent.

21. The arrangement as defined in claim 20, wherein said compacting and compressing means is a briquetting rolling mill.

22. The arrangement as defined in claim 21, wherein the amount of said added waste which is a fossil fuel is dictated by the sulphur content of the solid fuel product.

23. A method of processing refuse, sewage and waste comprising the steps of,
   a. reducing the size of collected refuse,
   b. adding combustible waste to the reduced refuse,
   c. compressing excess moisture from the reduced refuse and waste and forming it into a filtering medium,
   d. passing raw sewage through the filtering medium for removing sludge from the raw sewage, and
   e. dewatering the sludge and filtering medium.

24. The method as defined in claim 23, comprising the further step of separating metallic objects from the collector refuse.

25. The method as defined in claim 24, comprising the further steps of feeding the dewatered medium for recompression and for selectively adding combustible waste to the dewatered medium in accordance with the sulphur content of the stored dewatered medium to form fuel.

26. The method as defined in claim 23, comprising the further steps of stopping the size reduction of the collected refuse and of starting the addition of waste to the dewatered medium, and compacting and compressing the added waste and dewatered medium to remove excess liquid and forming it into useable fuel.

27. A process for forming collected refuse, waste material and sewage influent into a source of energy comprising, shredding the collected refuse, separating metallic objects from the shredded refuse, adding waste material to the separated refuse, compressing the refuse and waste material to remove excess liquid, filtering sewage influent through the compressed waste and refuse material, dewatering and pelletizing the filtered waste and refuse material, adding additional waste material to the pelletized material and briquetting the added waste and pelletized material to remove excess water and to form briquettes.

28. A process for forming collected refuse, waste mater and sewage influent into a useable fuel comprising, separating metallic articles from the collected refuse, mixing waste material with the separated refuse, compressing the mixture of waste refuse, passing sewage influent through the mixture, removing excess water from the mixture, adding waste material to the dewatered mixture, and briquetting the waste material and dewatered mixture.

29. An arrangement comprising, a bin for receiving collected refuse, a separator for removing metallic objects from the collected refuse, a shredder for shredding the separated refuse, a waste storage hopper for mixing material with the shredded refuse, a rolling mill for compressing excess moisture from the shredded refuse and waste material and forming it into briquettes, a filtration tank for receiving the briquettes and forming it into a filter bed, a sewage inlet located in said filtration tank for passing sewage influent through the filter bed for causing solids, matter in suspension and precipitates to be entrapped by the filter bed, a liquid level sensing device for monitoring the liquid level in the filtration tank, a filter bed depth detecting device for sensing the depth of the filtered bed, a transporter for removing expended material from the filter bed, an extruder for pelletizing the expended material, a pellet storage bin and dispensing hopper for receiving pellets, a waste dispensing hopper for mixing waste with the pellets, and a conveyor for moving the mixture to the rolling mill for removing excess moisture from the mixture and forming it into briquettes.

30. An arrangement comprising, a refuse storage bin for receiving collected refuse and having a vibrator and a movable door for allowing the collected refuse to be dropped onto a moving belt conveyor, a separator for removing magnetic articles from the collected refuse and for carrying the separated refuse to the inlet of a shredder, said shredder homogenizing the separated refuse and discharging the homogenized refuse onto a feeder conveyor for feeding a rolling mill which compacts the homogenized refuse, a waste dispensing hopper for adding acidic waste to the compacted refuse, the compacted refuse and acidic waste being fed to a rolling mill for briquetting, the briquettes are dropped into a vibrational feeder, the feeder moves the briquettes to a filtration tank to form a filtering bed, a sewage inlet conduit supplies raw sewage to the filtration tank so that solids, matter in suspension and precipitates are entrapped by said filtering bed, a level sensor for sensing a given amount of liquid in said tank, a level detector for sensing the depth of said filtering bed, a screw auger in said tank for transporting expended filtering material to an extruder for pelletizing the expended filtering material, a cleated conveyor for selectively moving the pellets to a dispensing hopper, each of the dispensing hoppers having a vibrator and a controllable door for distributing pellets and waste onto the feeder conveyor for supplying said rolling mills which form relatively dry, stable, odorless briquettes having a relatively high B.T.U. value.

31. A facility comprising, means for receiving collected refuse, means for shredding commingled and separating metallic object from the refuse, means for adding acidifiable waste to the refuse, means for mechanically compressing the refuse and waste for removing excessive fluid and forming the refuse and waste into briquettes, means for supplying the briquettes to filtering means and for forming the briquettes into a filtering bed, means for causing the passage of raw sewage through the filter bed to separate solids, matter in suspension and precipitates from the sewage, means for removing expended material from the filter bed, means for expelling excess water from the expended material, means for adding additional waste to the dewatered expended material, and means for mechanically compressing the waste and expended material so that excessive moisture is removed and briquettes are formed from the waste and expended material.

32. A system comprising, means for receiving collected heterogeneous refuse, means for separating ferromagnetic objects from the collected heterogeneous refuse, means for shredding the collected heterogeneous refuse, means for adding waste to the shredded refuse, means for compressing, dewatering and briquetting the waste and shredded refuse, means for feeding the briquetted waste and refuse to filtration means wherein the briquetted waste and refuse form a filter bed, means for passing raw sewage through the filter bed wherein solids, matter in suspension and precipitates are filtered from the incoming raw sewage by the filter briquettes, means for removing expended filter briquettes from the filter bed, means for dewatering and pelletizing the expended filter briquettes, means for mixing waste with the pellets, and means for compressing, dewatering and briquetting and mixture of waste and pellets to form high stable fuel briquettes.

* * * * *